Dec. 6, 1932.   A. P. BARCELO   1,889,912
EGG OPENER
Filed Sept. 17, 1930
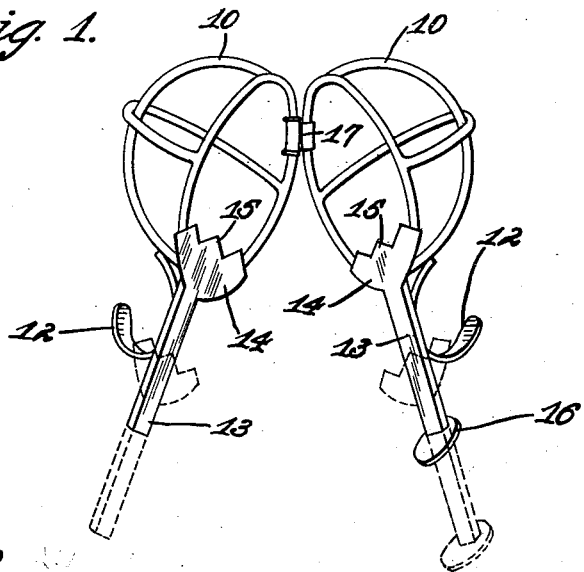
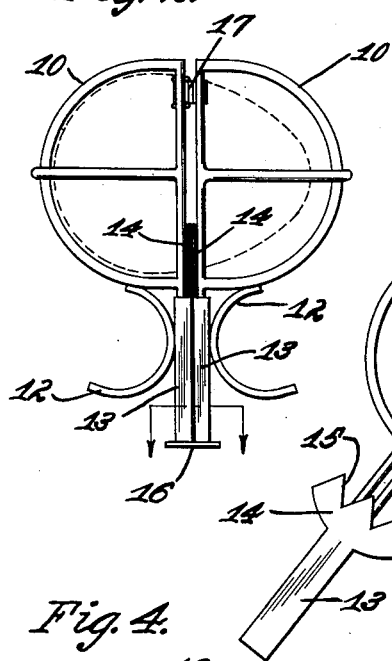
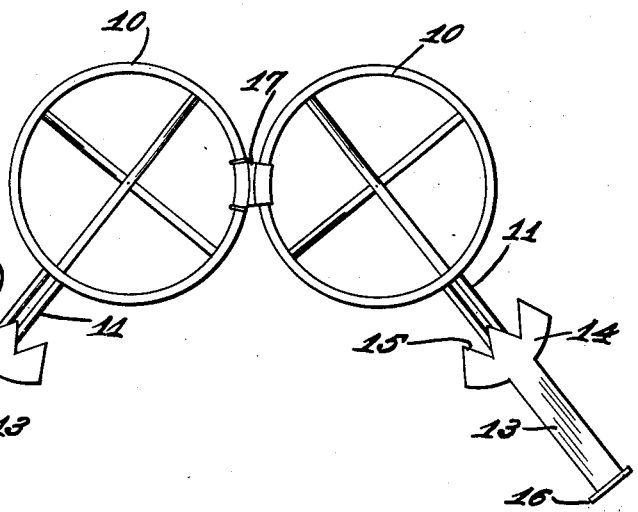
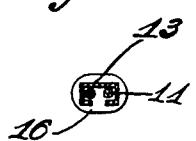
A. Portuondo Barceló.
INVENTOR
BY *Victor J. Evans*
ATTORNEY
WITNESS: *George L. Ogle.*

Patented Dec. 6, 1932

1,889,912

UNITED STATES PATENT OFFICE

ANDRÉS PORTUONDO BARCELÓ, OF SANTIAGO, CUBA

EGG OPENER

Application filed September 17, 1930, Serial No. 482,575, and in Cuba May 7, 1930.

This invention relates to egg openers, an object being to provide a device within which an egg may be placed and the shell broken and separated for the removal of its contents, without requiring that the hands come in contact with the white or yolk of a raw egg, and thus prevent possible unsanitary handling, or with the shell of a hot egg, so that the latter may be opened without burning the fingers.

Another object of the invention is the provision of an egg opener which combines means to penetrate or break the shell of the egg and to retain the broken egg or shell within the holder.

Another object of the invention is the provision of an egg opener which is simple and economical in construction and reliable and efficient in use.

With the above and other objects in view, the invention further includes the following novel features and details of construction, to be hereinafter more fully described, illustrated in the accompanying drawing and pointed out in the appended claims.

In the drawing:—

Figure 1 is a perspective view of an egg opener constructed in accordance with the invention.

Figure 2 is an elevation showing the closed position of the opener.

Figure 3 is an elevation with the device fully open.

Figure 4 shows a transverse section through the sleeve and arms shown in Figure 2.

Referring to the drawing in detail wherein like characters of reference denote corresponding parts, the reference character 10 indicates a pair of cup-like members which are of like construction and which are preferably made of wire so as to form cup-like frames. Extending radially from these frames are arms 11, preferably formed of parallel pieces of wire, while connecting these arms and the frames are substantially semicircular finger pieces 12. These finger pieces act to brace the arms and frames but are primarily intended to be engaged by the fingers of a person using the opener.

Slidingly mounted upon the arms 11 are sleeves 13. These sleeves are longitudinally split so as to accommodate the finger pieces 12 and permit the sleeves to be moved longitudinally of the arms. The sleeves are preferably flat in cross section and have extending from their inner ends, knife-like penetrating elements 14 having a tooth or serrated penetrating edge 15.

Carried at the outer end of one of the sleeves 13 is a thumb piece 16 and this thumb piece projects sufficiently to engage the outer end of the other sleeve 13.

The members 10 are hingedly connected as shown at 17 and may be opened as shown in Figure 3 of the drawing so as to receive an egg. The members are then closed as shown in Figure 2 and in this position the thumb piece 16 will engage beneath the outer end of the opposite sleeve 13 and when the fingers are engaged with the finger pieces 12, pressure upon the thumb piece 16 will move the penetrating elements 14 inward so as to separate the egg.

As will be seen from the drawing, these penetrating elements 14, in addition to separating the egg, also act as retaining elements to prevent the egg from accidentally dropping from the cup-shaped members.

The invention is susceptible of various changes in its form, proportions and minor details of construction and the right is herein reserved to make such changes as properly fall within the scope of the appended claims.

Having described the invention what is claimed is:—

1. In an egg opener, a pair of cup-shaped hingedly connected frames, an arm extending radially from each of said frames, a sleeve slidable longitudinally upon each arm, a shell penetrating element carried by each sleeve and adapted to be projected over the edges of the cup-shaped frames when the sleeves are moved inward, a thumb piece carried by one of the sleeves and engageable with the other sleeve to simultaneously move said sleeves inward, and finger pieces rigid with the frames and arms.

2. In an egg opener, a pair of cup-shaped hingedly connected frames, an arm extending radially from each of said frames, a sleeve mounted on each arm and slidable longitudinally thereof, a shell penetrating element carried on the end of each sleeve adjacent with the cup-shaped member and adapted to be projected over the edges of the cup-shaped frames when the sleeve is moved inward, a thumb piece carried by one sleeve, and finger pieces rigid with the frames and arms.

In testimony whereof I affix my signature.

ANDRÉS PORTUONDO BARCELÓ.